United States Patent
Hall et al.

(10) Patent No.: US 7,245,418 B2
(45) Date of Patent: Jul. 17, 2007

(54) ELECTRO-OPTIC SWITCHING APPARATUS NOT REQUIRING DC BIAS

(75) Inventors: David B. Hall, La Crescenta, CA (US); Carl Bathelt, Jr., Simi Valley, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 218 days.

(21) Appl. No.: 11/083,736

(22) Filed: Mar. 18, 2005

(65) Prior Publication Data

US 2006/0209389 A1    Sep. 21, 2006

(51) Int. Cl.
*G02F 1/29* (2006.01)
(52) U.S. Cl. ............... 359/320; 359/245; 359/255
(58) Field of Classification Search ........ 359/245–264, 359/315–320
See application file for complete search history.

(56) References Cited

U.S. PATENT DOCUMENTS

| 5,247,387 A | * | 9/1993 | Matsubara et al. ......... 359/245 |
| 5,448,058 A | | 9/1995 | Arab-Sadeghabadi |
| 5,852,507 A | | 12/1998 | Hall |

FOREIGN PATENT DOCUMENTS

| EP | 0 436 344 | 7/1991 |
| JP | 03 073916 | 3/1991 |
| WO | WO 89 11675 | 11/1989 |

OTHER PUBLICATIONS

Nakajima, H., Development on Guided-Wave Switch Arrays, IEICE Trans. Electron, Feb. 1999, pp. 297-304, vol. E82, No. 2, Japan.
Kirkendall, et al., Overview of High Performance Fibre-Optic Sensing, Journal of Physics, Sep. 2004, pp. R197-R216, United Kingdom.

* cited by examiner

*Primary Examiner*—Evelyn A. Lester
(74) *Attorney, Agent, or Firm*—Carmen B. Patti & Assoc., LLC

(57) ABSTRACT

An OFF state, maximum attenuation level, for an electro-optic attenuator/switch results when either a first or second control voltage is applied to the control input. An AC generator, coupled to the control input, generates minimum and maximum peak voltages that correspond to the first and second control voltages, respectively, so that the maximum attenuation level of the light beam being switched is provided by the electro-optic attenuator while either of the minimum and maximum peak voltages is applied to the control input. An ON state is achieved by introducing a voltage pulse with a magnitude corresponding to the minimum attenuation level. The ON voltage pulse is added to the square wave. This permits operation of the electro-optic switch in a normally OFF state without requiring a DC bias voltage.

17 Claims, 2 Drawing Sheets

ELECTRO-OPTIC SWITCHING APPARATUS NOT REQUIRING DC BIAS

CROSS-REFERENCE TO RELATED APPLICATION

This application contains subject matter that is related to the subject matter of the following application, which is assigned to the same assignee as this application. The below-listed application is hereby incorporated herein by reference in its entirety:

"ON/OFF OPTICAL SWITCHING USING COMBINED ACOUSTO-OPTIC AND ELECTRO-OPTIC SWITCHES," by Dr. David B. Hall, Ser. No. 11/083,731 now U.S. Pat. No. 7,035,499, filed concurrently herewith.

TECHNICAL FIELD

The invention relates to optical switches and more particularly to the control of the ON/OFF switching of electro-optic switches.

BACKGROUND

Electro-optic switches are used for a variety of applications in which a laser light beam is switched between ON/OFF states. For example, electro-optic switches utilized in telecommunication systems are typically maintained in an OFF state by an applying a bias DC voltage, e.g. −2 volts, to the control input and are switched to a maximum light transmission state (ON) by causing +2 volts to be applied to the control input. This can be accomplished by adding a +4 volt pulse to the −2 volt DC bias. Such electro-optic switches have generally proved successful in such applications.

Problems are associated with a drift of the applied DC bias necessary to keep the switch in a normally OFF state. Charge migration effects within the optical switch cause this drift over time and/or temperature. Failing to maintain the proper DC bias voltage results in the electro-optic switch not being fully OFF, i.e. the maximum attenuation that can be provided by the switch will not be attained. This causes in a decrease in the ON to OFF signal ratio and increases the amount of bleed-through light passing through the switch during the OFF state. Thus, there exists a need for an improvement in controlling electro-optical switches that will minimize this problem.

SUMMARY

It is an object of the present invention to substantially solve this problem.

The invention in one implementation encompasses an apparatus. The apparatus includes an electro-optic attenuator (switch) that provides controllable attenuation of a light beam. The electro-optic attenuator has a control input and has a maximum attenuation level that results when either a first or second control voltage is applied to the control input. A driver of the control input includes an AC generator that generates minimum and maximum peak voltages that correspond to the first and second control voltages, respectively, so that the maximum attenuation level is provided by the electro-optic attenuator while either of the minimum and maximum peak voltages is applied to the control input. This keeps the electro-optic switch in a maximum OFF state as a normal condition without requiring a DC voltage source for providing a DC bias voltage to the control input.

Another implementation of the invention encompasses a method for controlling an electro-optic switch having a control input and switching a light beam between an ON and OFF state. The ON or OFF state results when either first or second control voltages are applied to the control input and the other state results when a third control voltage different from the first or second voltages is applied to the control input.

DESCRIPTION OF THE DRAWINGS

Features of exemplary implementations of the invention will become apparent from the description, the claims, and the accompanying drawings in which:

DETAILED DESCRIPTION

One of the aspects of the present invention resides in the recognition that an AC waveform, with appropriate peak-to-peak voltages, can be employed to replace the normally used DC bias voltage to maintain the electro-optic switch in either a normally ON or OFF state. As will be explained below, an EO driver can include a square wave generator with an appropriate peak-to-peak voltage so as to provide a normally maximum OFF (null) state of the electro-optic switch without requiring the use of a bias voltage supplied by a DC voltage source.

Figure 1:
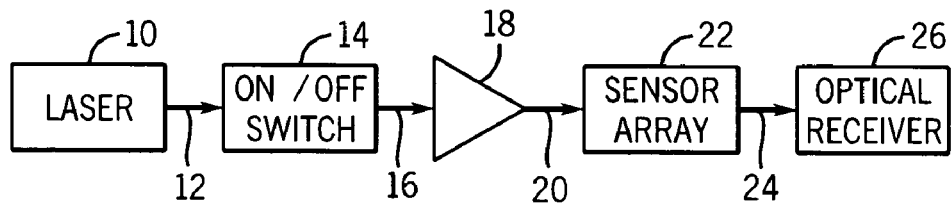
FIG. 1 is a block diagram of an exemplary sensor system that employs an optical ON/OFF switch in accordance with the present invention.

FIG. 1 shows an exemplary sensor system in which a light source 10, such as a laser, generates a light beam 12 that is switched by an ON/OFF switch 14. The switched light beam output 16 is amplified by amplifier 18 and transmitted as an input light beam to sensor array 22 that may for example comprise a plurality of interferometers coupled together to provide time division multiplexed outputs in response to an input pulse of light. The output 24 of the sensor array 22 is coupled to an optical receiver 26 that decodes the information encoded on each of the TDM pulses from the sensor array. Although this system is offered as an example suited for incorporation of an embodiment of the ON/OFF switch in accordance with the present invention, it will be apparent that a variety of other applications and uses exist.

Figure 2:
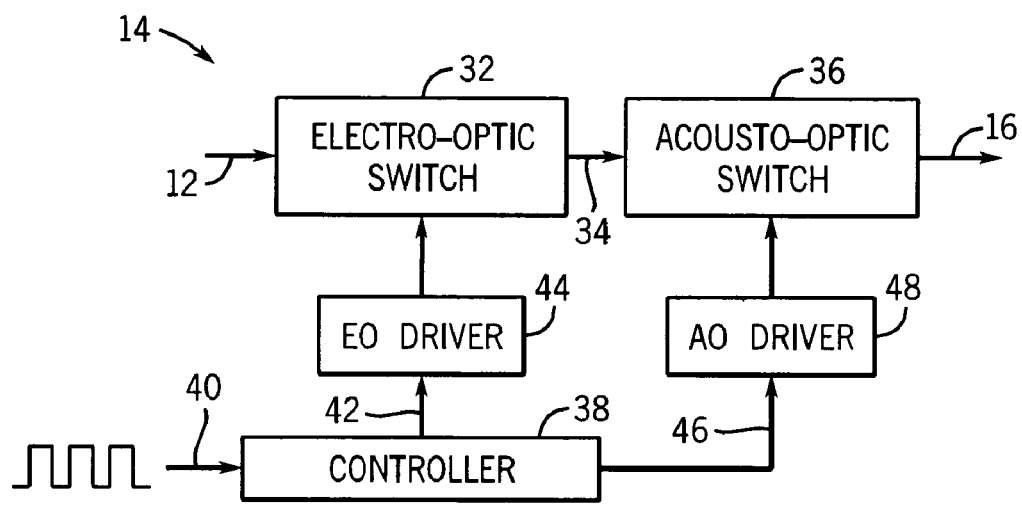
FIG. 2 is a block diagram of an exemplary optical switch that includes an electro-optic switch in accordance with the present invention.

FIG. 2 is an exemplary embodiment of an optical switch 14. The incoming light beam 12 is switched by two optical switches in series resulting in a switched output light beam 16. In this example, an electro-optic (EO) switch 32 provides an ON/OFF switching function of light beam 12 and produces a switched output light beam 34 that is coupled as an input to acousto-optic (AO) switch 36. The acousto-optic switch 36 also provides an ON/OFF switching function and produces an output switched light beam 16. A reason for using two optical switches in series with each being switched ON and OFF in synchronization is to increase the maximum attenuation achievable during the OFF state. The total attenuation provided by switch 32 and 36 when both are in the OFF state is the product of the attenuations provided by each switch.

A controller 38 receives clock information on input 40 where the clock information provides a periodic time frame that defines a frequency of operation. In the illustrative example, the switch 14 is switched ON in accordance with the periodic time frame to provide a corresponding series of light pulses were the duration of the light pulse is relatively small compared to the time duration between light pulses. The controller 38 provides an output 42 to the EO driver 44 and an output 46 to the AO driver 48. The AO switch 36 may comprise a commercially off the shelf available component such as from Brimrose Company and the EO switch 32 may likewise comprise a commercially off the shelf available component such as from JDS Uniphase Company. The AO driver 48, which may be integrated with the switch itself, may comprise a known driving arrangement for the AO switch and may require a nominal TTL output voltage states to define corresponding OFF and ON states. The EO switch 32 has an input terminal that is responsive to an applied control voltage to cause the switch provide a corresponding attenuation level as will be explained in the discussion of FIG. 3.

The exemplary EO driver 44 in accordance with the present invention preferably includes a square wave signal generator in which the peak voltage amplitudes of the square waves correspond to different first and second voltages each associated with a maximum OFF state of the EO switch. Of course, it will be understood by those skilled in the art that the first and second voltages could be each associated with a maximum ON state of the EO switch if it was desired to maintain the EO switch in a normally ON state instead of a normally OFF state. The EO driver 44 further includes the ability to generate a voltage pulse that corresponds to the ON state of the switch where the magnitude of the voltage pulse corresponds to a maximum ON state of the switch. The EO switch may comprise a conventional square wave voltage generator selected to have a frequency/time frame compatible with the duration of the ON pulse time. For example, for an ON pulse duration of 0.2 microseconds (μs) with a 10 μs period between ON pulses, the period/frequency of the square wave can be selected to be 10 μs (100 kHz) or some sub-multiple of a 100 such as 50 or 25 kHz.

Figure 3:
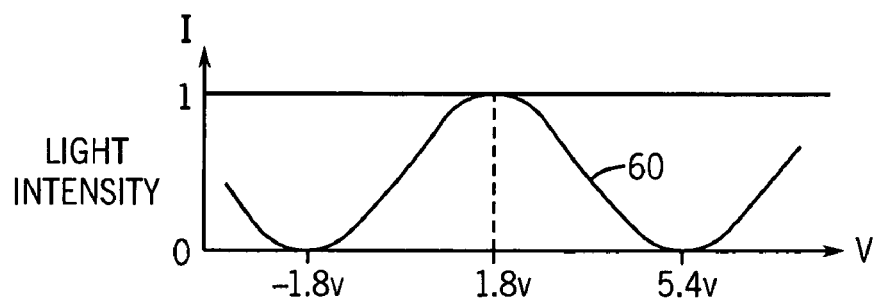
FIG. 3 is a graph of an exemplary characteristic of an electro-optical switch illustrating relative light transmission as a function of control voltage.

FIG. 3 shows a graph of an exemplary control function of an electro-optic switch in which the intensity of light passing through the switch is shown as a function 60 of control input voltage. In this exemplary graph, the vertical axis represents light intensity where a light intensity of zero indicates maximum attenuation, i.e. a minimum of light passing through the switch, and a light intensity of 1 indicates a minimum attenuation, i.e. a maximum of light passing through the switch. A continuum of control voltages shown on the horizontal axis shows how the attenuation of light passing through the EO switch is controlled as a function of voltage. In the illustrative example, maximum attenuation occurs in response to a control voltage of −1.8 V and a control voltage of +5.4 V. A minimum attenuation corresponding to maximum light transmission through the switch occurs at a control voltage of +1.8 V. In this illustrative example, a 3.6 volt differential exists between OFF and ON states, and applying plus or minus 7.2 V to an existing control voltage will result in the same attenuation state of the EO switch. Thus, a square wave generator with peak voltages of −1.8 V and +5.4 V applied as the control voltage to the EO switch will cause the switch to be in an OFF state for both peak voltages. That is, assuming that the transition times between peak voltages is negligible for the square wave generator, the EO switch would be maintained in a normally OFF state by the application of such a control voltage waveform.

An ON/OFF electro-optic switch is characterized by a half wave voltage $V_\pi$ that moves the optical transmission state from a minimum to a maximum. Twice $V_\pi$ moves the switch from one minimum to an adjacent minimum. Generally, twice $V_\pi$ moves the switch from any transmission state to the same transmission state. Therefore, an electro-optic switch driven by a square wave with a peak-to-peak amplitude of twice $V_\pi$ has a constant optical output.

A duty cycle α can range between 0 and 1, and represents the fraction of time spent at the upper voltage $V+V_\pi$; 1−α represents the fraction of time spent at the lower voltage $V-V_\pi$. AC coupling means that the time averaged voltage is zero so the following equation describes such a duty cycle:

$$\alpha(V+V_\pi)+(1-\alpha)(V-V_\pi)=0 \qquad (1)$$

Solutions to equation (1) are:

$$\text{upper voltage: } V+V_\pi=2(1-\alpha)V_\pi \qquad (2)$$

$$\text{lower voltage: } V-V_\pi=-2\alpha V_\pi \qquad (3)$$

As can be seen from equations (2) and (3), a 50-50 duty cycle, e.g. α=0.5, gives an upper voltage of $+V_\pi$ and a lower voltage of $-V_\pi$. As the duty cycle a varies from 0 to 1, the upper voltage level varies from 2 $V_\pi$ to zero, and the lower voltage level varies from zero to −2 $V_\pi$.

The raised cosine output response of an interferometer switch as a function of voltage U with a built-in optical bias $V_{OB}$ is given by:

$$I(U)=0.5\ I_0+0.5\ I_0 \cos[(\pi/V_\pi)(U+V_{OB})] \qquad (4)$$

Setting the voltage U to either the upper voltage level $V+V_\pi$ or lower voltage level $V-V_\pi$ gives:

$$I=0.5\ I_0-0.5\ I_0 \cos[(\pi/V_\pi)(V+V_{OB})] \qquad (5)$$

$$I=0.5\ I_0-0.5\ I_0 \cos[(\pi/V_\pi)(V+V_{OB}-2\alpha V_\pi)]$$

Adjustment of the duty cycle a to set the optical switch output to zero yields:

$$\alpha=(0.5/V_\pi)(V_\pi+V_{OB}) \qquad (6)$$

Figure 4:
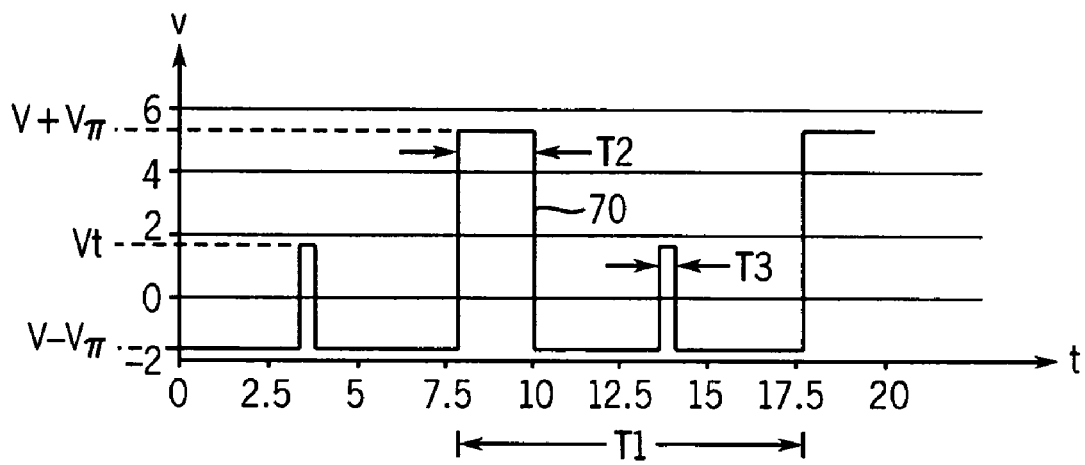
FIG. 4 is a graph of an exemplary voltage waveform suited for controlling an electro-optical switch in accordance with the present invention.

FIG. 4 is a graph of an exemplary waveform 70 for electro-optic switch 32 having an ON state lasting 0.2 microseconds (T3) at a rate of about 100 kHz, or one ON state pulse every 10 microseconds (T1). For such an application, the frequency of the AC square wave with the variable duty cycle can be set to 100 kHz or a sub-multiple such as 50 kHz or 25 kHz. For a 100 kHz square wave, the ON state pulse occurs once each square wave cycle; for a 50 kHz square wave, the ON state pulse occurs once every two square wave cycles. The illustrative duty cycle is 25%, i.e. T2=2.5 microseconds versus T1=10 microseconds.

The upper voltage $V+V_\pi$ on the square wave corresponds to one OFF state and the lower voltage $V-V_\pi$ corresponds to an adjacent OFF state. The mid-point voltage V corresponds to a maximum ON state. The ON state pulse is generated by a voltage excursion of $V_\pi$ from the lower voltage $V-V_\pi$. Alternatively, the ON state pulse could be generated by a voltage excursion of $-V_\pi$ from the upper voltage $V+V_\pi$. Equation (1) is modified in view of the ON state pulse and produces a minor shift in the duty cycle α.

Let the duty cycle α be the fraction of time spent at $V+V_\pi$, β the fraction of time spent at V, and 1−α−β the fraction of time spent at $V-V_\pi$ to yield:

$$\alpha(V+V_\pi)+(1-\alpha-\beta)(V-V_\pi)+\beta V=0 \quad (7)$$

Solutions to equation (7) are:

$$\text{upper voltage } V+V_\pi=2(1-\alpha)V_\pi-\beta V_\pi \quad (8)$$

$$\text{mid-point voltage } V=(1-2\alpha)V_\pi-\beta V_\pi \quad (9)$$

$$\text{lower voltage } V-V_\pi=-2\alpha V_\pi-\beta V_\pi \quad (10)$$

From equations (5) and (9), the optical bias required to set the OFF state to zero, and the ON state to the peak value is:

$$V_{OB}=-V=(2\alpha-1)V_\pi+\beta V_\pi \quad (11)$$

Equation (11) differs from equation (6) only in that the additional term $\beta V_\pi$ is present. Thus, $V_{OB}$ is changed by the presence of the ON pulse T3 by only a very small amount: $(2\alpha-1+\beta)/(2\alpha-1)$. For a duty cycle of 25% (α=0.25) and T3=2% (β=0.02) and a half wave voltage $V_\pi$ of 3.6 volts, the $V_{OB}$=−1.728 volts, i.e. the ON pulse changed the optical bias voltage $V_{OB}$ by only 0.072 volts.

Figure 5:
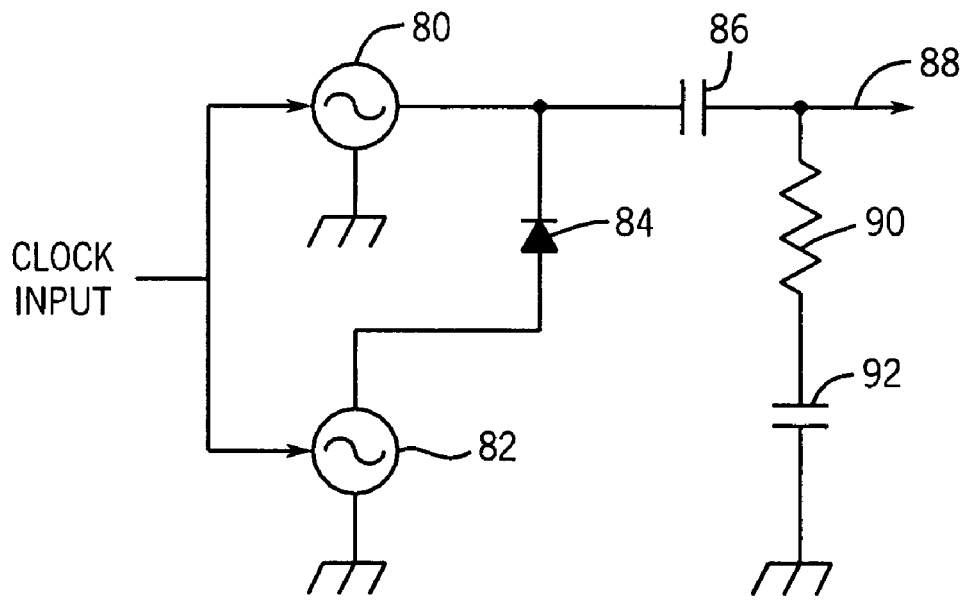
FIG. 5 is a circuit diagram of an embodiment of an electro-optic driver for an electro-optic switch in accordance with the present invention.

FIG. 5 shows an exemplary representation of an embodiment of an EO driver in accordance with the present invention. A square wave signal generator 80 has predetermined peak voltages set in accordance with the present invention to establish a normally OFF state of the EO switch. Signal generator 82 generates a 0.2 μs pulse having a predetermined magnitude set in accordance with the present invention to establish a maximum ON state of the EO switch. A clock input provided from controller 38 provides synchronization for generators 80 and 82. The output of generator 82 is connected through diode 84 to add with the output of generator 80. The resulting waveform, such as shown in FIG. 4, is coupled through capacitor 86 to output 88 that is coupled to the input control terminal of the EO switch. Resistor 90 in series with capacitor 92 is coupled between output 88 and ground.

The present invention is suited for a variety of applications. In general, any type of electro-optic attenuator/switch having two or more control levels that define the same condition can benefit by not having to utilize a DC bias voltage to maintain the switch normally in a given state. The exemplary embodiment explained herein operates in a normally OFF state and is switched to an ON state. Alternatively, an electro-optic switch could also be operated in a normally ON mode by selecting appropriate upper and lower voltage levels for the AC waveform that correspond to adjacent ON states.

It will be apparent to those skilled in the art that an optical switching device can be operated in an attenuation mode as opposed to an ON/OFF mode. Such an attenuation usage can be advantageous for required applications such as for modulators. In such an application, the optical switching device could be operated to cause attenuation of the light beam to be other than a maximum attenuation level (OFF state) or a minimum attenuation level (ON state). Such an attenuator acting as a modulator could be normally operated at an OFF, ON or intermediate state, and cause various changes in the attenuation level in proportion to a control signal, whereby amplitude (intensity) modulation of the light beam in accordance with the control signal is accomplished. Even if the optical switching device is operated as a modulator, stability benefits can be obtained by utilizing an AC waveform to establish and maintain a defined normal state without requiring a DC bias voltage source.

Although a separate AC generator 80 and an AC signal source 82 are shown, it will be understood that the outputs could be generated by a single voltage generator. Other hardware and software based implementations of an EO driver can be utilized to perform the required functions. One or a plurality of ON/OFF switches can be utilized depending upon the required application. In the illustrative example of FIG. 2, two switches are connected in series to achieve greater attenuation in the OFF state. A plurality of EO switches could be connected in series to produce greater OFF attenuation levels.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus for switching a light beam comprising:
an electro-optic attenuator adapted to provide controlled attenuation of the light beam, having a control input, and having ON and OFF states, one of the ON and OFF states results when either first or second control voltages are applied to the control input, where the first and second control voltages are different voltages, and the other of the ON and OFF states results when a third control voltage is applied to the control input; and
a voltage generator, coupled to the control input, generates first, second and third voltages where the first and second voltages are substantially equal to the first and second control voltages, respectively, so that the one of the ON and OFF states is provided by the electro-optic attenuator while either of the first or second voltages is applied to the control input, the third voltage being substantially equal to the third control voltage where the third voltage applied to the control input causes the other of the ON and OFF states;
the voltage generator generating alternating current, AC, output voltages having upper and lower peak voltages, wherein the first and second control voltages are each set to one of the upper and lower peak voltages and the third control voltage is set to the other of the upper and lower peak voltages, the first control voltage being greater than zero volts and the second control voltage being less than zero volts;
the electro-optic attenuator having a half wave voltage of $V_\pi$ and a built-in optical bias $V_{OB}$, the voltage generator having a duty cycle α selected in accordance with the equation $$\alpha=(0.5/V_\pi)(V_{90}+V_{OB});$$

the voltage generator generating an average voltage applied to the control input of the electro-optic attenuator of substantially zero volts based on satisfaction of said equation.

2. The apparatus of claim 1 wherein the voltage generator produces square wave output voltages.

3. The apparatus of claim 2 wherein the voltage generator causes the electro-optic attenuator to be in the one of the ON and OFF states without using a source of DC bias coupled to the control input.

4. The apparatus of claim 1 wherein the one state is OFF and the other state is ON.

5. The apparatus of claim 1 further comprising at least one additional light beam attenuator coupled in series with the electro-optic attenuator and switched in synchronism with the electro-optic attenuator so that the attenuators are in the same ON and OFF states.

6. The apparatus of claim 1 wherein:
the electro-optic switch is set to an OFF state (maximum first attenuation level) that results when either the first or second control voltages are applied to the control input, where the first and second control voltages are different, and is set to an ON state that results when a third control voltage is applied to the control input;
the voltage generator generating minimum and maximum voltages that are substantially equal to the first and second control voltages, respectively, so that the first attenuation level of the light beam is provided by the electro-optic switch while control input of the electro-optic switch is set to either of the minimum and maximum peak voltages, the voltage generator generating an intermediate voltage being substantially equal to the third control voltage where the control input of the electro-optic switch is set to the ON state with the intermediate voltage applied to the control input.

7. The apparatus of claim 6 wherein the voltage generator produces square wave output voltages.

8. The apparatus of claim 7 the voltage generator causes the electro-optic attenuator to be in the OFF state without using a source of DC bias coupled to the control input.

9. The apparatus of claim 6 wherein periodic frames of control input voltage consist of a sum of a time duration of the maximum voltage level, a time duration of the minimum voltage level, and a time duration of the intermediate voltage, where the cumulative sum is 100% of the time of each periodic frame.

10. An apparatus for switching a light beam comprising:
an electro-optic attenuator adapted to provide controlled attenuation of the light beam, having a control input, and having ON and OFF states, one of the ON and OFF states results when either first or second control voltages are applied to the control input, where the first and second control voltages are different voltages, and the other of the ON and OFF states results when a third control voltage is applied to the control input; and
a voltage generator, coupled to the control input, generates first, second and third voltages where the first and second voltages are substantially equal to the first and second control voltages, respectively, so that the one of the ON and OFF states is provided by the electro-optic attenuator while either of the first or second voltages is applied to the control input, the third voltage being substantially equal to the third control voltage where the third voltage applied to the control input causes the other of the ON and OFF states;
wherein the voltage generator generates the first, second and third voltages for corresponding first, second and third time intervals within a time frame where the sum of the first voltage multiplied by the percentage of the first time interval compared to the time frame and the second voltage multiplied by the percentage of the second time interval compared to the time frame and the third voltage multiplied by the percentage of the third time interval compared to the time frame substantially equals zero.

11. The apparatus of claim 10 wherein the voltage generator provides the control input of the electro-optic attenuator with repeating series of the time frames.

12. An optical switching apparatus that provides controllable ON and OFF switching of a light beam comprising:
an electro-optic switch having a control input, an OFF state (maximum first attenuation level) that results when either first or second control voltages are applied to the control input, where the first and second control voltages are different, and an ON state that results when a third control voltage is applied to the control input;
a voltage generator, coupled to the control input, generates minimum and maximum voltages that are substantially equal to the first and second control voltages, respectively, so that the first attenuation level of the light beam is provided by the electro-optic switch while either of the minimum and maximum peak voltages is applied to the control input, the voltage generator generating an intermediate voltage being substantially equal to the third control voltage where the intermediate voltage applied to the control input causes the ON state;
wherein the voltage generator generates the minimum, maximum and intermediate voltages for corresponding first, second and third time intervals within a time frame, where the sum of the minimum voltage multiplied by the percentage of the first time interval compared to the time frame and the maximum voltage multiplied by the percentage of the second time interval compared to the time frame and the intermediate voltage multiplied by the percentage of the third time interval compared to the time frame substantially equals zero.

13. The apparatus of claim 12 wherein periodic frames of control input voltage consist of a sum of a time duration of the maximum voltage level, a time duration of the minimum voltage level, and a time duration of the intermediate voltage, where the cumulative sum is 100% of the time of each periodic frame.

14. A method for controlling an electro-optic switch having a control input and adapted to switch a light beam between ON and OFF states comprising the steps of:
generating a three level voltage output having predetermined upper and lower voltage levels that correspond to first and second control voltages, respectively, where one of the ON and OFF states results when either the first or second control voltages are applied to the control input, the three level voltage output having an intermediate voltage level that corresponds to a third control voltage where the other of the ON and OFF states results when the third control voltage is applied to the control input;
coupling the three level voltage output to the control input so that the one state is provided by the electro-optic switch while either of the upper and lower voltage levels are applied to the control input to maintain the electro-optic switch normally in the one state, where the one state is normally maintained in response to the output without requiring the application of a DC voltage to the control input, the other state is provided by the electro-optic switch while the intermediate voltage level is applied to the control input;
the three level voltages being alternating current, AC, output voltages having upper and lower peak voltages, wherein the upper and lower voltage levels are each set to one of the upper and lower peak voltages and the intermediate voltage level is set to the other of the upper and lower peak voltages, the upper voltage level being greater than zero volts and the lower voltage level being less than zero volts;
an electro-optic attenuator of the electro-optic switch having a half wave voltage of $V_\pi$ and a built-in optical bias $V_{OB}$, a duty cycle α for time spent among the upper, lower and intermediate voltage levels selected in accordance with the equation $\alpha=(0.5/V_\pi(V_\pi+V_{OB})$;

the average voltage applied to the control input being substantially zero volts based on satisfaction of said equation.

15. The method of claim 14 wherein one frame of a series of repeating frames of three level voltage output has a time duration T, and where a sum of a time duration of the maximum voltage level, a time duration of the minimum voltage level, and a time duration of the intermediate voltage equals 100% of T.

16. A method for controlling an electro-optic switch having a control input and adapted to switch a light beam between ON and OFF states comprising the steps of:

generating a three level voltage output having predetermined upper and lower voltage levels that correspond to first and second control voltages, respectively, where one of the ON and OFF states results when either the first or second control voltages are applied to the control input, the three level voltage output having an intermediate voltage level that corresponds to a third control voltage where the other of the ON and OFF states results when the third control voltage is applied to the control input;

coupling the three level voltage output to the control input so that the one state is provided by the electro-optic switch while either of the upper and lower voltagelevels are applied to the control input to maintain the electro-optic switch normally in the one state, where the one state is normally maintained in response to the output without requiring the application of a DC voltage to the control input, the other state is provided by the electro-optic switch while the intermediate voltage level is applied to the control input;

wherein the generating step generates the three level voltage output with the minimum, maximum and intermediate voltages for corresponding first, second and third time intervals within a time frame, where the sum of the minimum voltage multiplied by the percentage of the first time interval compared to the time frame and the maximum voltage multiplied by the percentage of the second time interval compared to the time frame and the intermediate voltage multiplied by the percentage of the third time interval compared to the time frame substantially equals zero.

17. The method of claim 16 wherein one frame of a series of repeating frames of three level voltage output has a time duration T, and where a sum of a time duration of the maximum voltage level, a time duration of the minimum voltage level, and a time duration of the intermediate voltage equals 100% of T.

* * * * *